(12) United States Patent
Maekawa et al.

(10) Patent No.: US 10,069,361 B2
(45) Date of Patent: Sep. 4, 2018

(54) ROTOR SECURING ARRANGEMENT AND ROTATING ELECTRIC MACHINE HAVING THE SAME

(71) Applicant: DENSO CORPORATION, Kariya, Aichi-pref. (JP)

(72) Inventors: Takeo Maekawa, Okazaki (JP); Shin Kusase, Obu (JP); Keiji Kondou, Nagoya (JP)

(73) Assignee: DENSO CORPORATION, Kariya (JP)

( * ) Notice: Subject to any disclaimer, the term of this patent is extended or adjusted under 35 U.S.C. 154(b) by 359 days.

(21) Appl. No.: 14/549,948

(22) Filed: Nov. 21, 2014

(65) Prior Publication Data
US 2015/0137655 A1    May 21, 2015

(30) Foreign Application Priority Data

Nov. 21, 2013 (JP) ................................. 2013-241105

(51) Int. Cl.
*H02K 1/30* (2006.01)
*H02K 1/27* (2006.01)
*H02K 16/04* (2006.01)

(52) U.S. Cl.
CPC ................. *H02K 1/30* (2013.01); *H02K 1/27* (2013.01); *H02K 16/04* (2013.01)

(58) Field of Classification Search
CPC ............. H02K 1/27; H02K 1/30; H02K 16/04
USPC ....... 310/216.089, 216.114, 216.129, 156.22
IPC ....................................................... H02K 1/30
See application file for complete search history.

(56) References Cited

U.S. PATENT DOCUMENTS

| | | | | | |
|---|---|---|---|---|---|
| 441,246 | A | * | 11/1890 | Lieb | H02K 15/12 310/216.017 |
| 1,267,993 | A | * | 5/1918 | Eaton | H02K 1/148 310/216.058 |
| 1,440,202 | A | * | 12/1922 | Yoast | H05B 3/141 219/520 |
| 3,612,930 | A | * | 10/1971 | Raby | H02K 1/28 310/216.058 |

(Continued)

FOREIGN PATENT DOCUMENTS

| | | |
|---|---|---|
| JP | 2000-152540 | 5/2000 |
| JP | 2005-318756 | 11/2005 |

(Continued)

OTHER PUBLICATIONS

Office Action (4 pgs.) dated Oct. 20, 2015 issued in corresponding Japanese Application No. 2013-241105 with an at least partial English language translation (5 pgs.).

*Primary Examiner* — John K Kim
(74) *Attorney, Agent, or Firm* — Nixon & Vanderhye P.C.

(57) ABSTRACT

A rotor securing arrangement for directly or indirectly securing a rotor to a shaft. The rotor has at least one through hole along a axial direction of the rotor. A second hole diameter of the at least one through hole at either or both of axial ends of the rotor is greater than a first hole diameter of the at least one through hole at a portion other than the axial ends of the rotor. The rotor securing arrangement includes a first securing member corresponding to the first hole diameter of the at least one through hole, and a second securing member corresponding to the second hole diameter of the at least one through hole. The first securing member is configured to directly or indirectly secure the rotor to the shaft with at least a portion of the second securing member between the first securing member and the rotor.

12 Claims, 10 Drawing Sheets

(56) References Cited

U.S. PATENT DOCUMENTS

| | | | | |
|---|---|---|---|---|
| 3,868,759 | A * | 3/1975 | Hartleroad | H01L 21/67144 198/381 |
| 4,316,111 | A * | 2/1982 | Merki | H02K 1/08 310/216.058 |
| 4,937,486 | A * | 6/1990 | Schwanda | H02K 3/527 310/197 |
| 6,812,602 | B2 * | 11/2004 | York | H02K 9/06 310/263 |
| 7,659,645 | B2 * | 2/2010 | Bi | F16F 15/08 310/216.124 |
| 7,919,898 | B2 * | 4/2011 | Wang | H02K 1/276 310/216.058 |
| 2007/0177978 | A1 * | 8/2007 | Bi | F16F 15/124 416/134 A |
| 2008/0265698 | A1 * | 10/2008 | Bi | F16F 15/08 310/51 |
| 2010/0090561 | A1 * | 4/2010 | Leroy | H02K 9/06 310/216.114 |
| 2012/0248920 | A1 | 10/2012 | Takahashi et al. | |
| 2013/0099618 | A1 | 4/2013 | Kusase | |
| 2013/0119789 | A1 | 5/2013 | Maekawa et al. | |
| 2014/0159532 | A1 | 6/2014 | Kondou et al. | |
| 2014/0159533 | A1 | 6/2014 | Kondou et al. | |
| 2015/0137655 | A1 * | 5/2015 | Maekawa | H02K 1/30 310/216.129 |

FOREIGN PATENT DOCUMENTS

| | | |
|---|---|---|
| JP | 2008-302789 | 12/2008 |
| JP | 2009-81938 | 4/2009 |
| JP | 2012-217285 | 11/2012 |
| JP | 2012-244649 | 12/2012 |
| JP | 2013-090531 | 5/2013 |
| JP | 2013-106471 | 5/2013 |
| JP | 2014-132817 | 7/2014 |

* cited by examiner

ROTOR SECURING ARRANGEMENT AND ROTATING ELECTRIC MACHINE HAVING THE SAME

CROSS-REFERENCE TO RELATED APPLICATION

This application is based on and claims the benefit of priority from earlier Japanese Patent Applications No. 2013-241105 filed Nov. 21, 2013, the descriptions of which are incorporated herein by reference.

BACKGROUND

Technical Field

The present invention relates to a rotor securing arrangement and a rotating electric machine having the rotor securing arrangement.

Related Art

A double-stator motor, as disclosed Japanese Patent Application Laid-Open Publication No. 2013-090531, can use a magnet prone to demagnetization, such as ferrite, and is intended to facilitate manufacturing. This double-stator motor includes an annular rotor connected to a rotary shaft to rotate in unison with the rotary shaft, an inner stator arranged radially inside the rotor, and an outer stator arranged radially outside the rotor.

With the double-stator motor as disclosed Japanese Patent Application Laid-Open Publication No. 2013-090531, maximizing the motor output within a limited housing space requires axial ends of the rotor core and the stator core coupled in magnetic circuit with each other to be aligned, or the axial end of the rotor core to be extended toward U-shape bridges. However, whether the rotor core is directly or indirectly connected to the rotary shaft using coupling members, such as rivets or the like, only head portions of the connecting members will protrude from the axial end face of the rotor, which requires part or the whole of a plate holding the outer and inner stator cores or U-shape bridges to be extended in the axial direction to avoid the protruding head portions. This leads to increase of the axial length of the motor.

The disc for connecting the rotor to the rotary shaft is commonly made of the same steel material as the shaft to eliminate looseness between the shaft and the disc coupled to the shaft caused by linear expansion. However, since the rotor core is coupled to the disc, magnetic leakage will occur from the magnet through the disc, which may lead to performance degradation.

In consideration of the foregoing, exemplary embodiments of the present invention are directed to providing a rotor securing arrangement and a rotating electric machine having the same, capable of reducing the axial length of the rotating electric machine and further capable of preventing magnetic leakage from a magnet of a rotor through a disc and thereby preventing performance degradation.

SUMMARY

In accordance with an exemplary embodiment of the present invention, there is provided a rotor securing arrangement for directly or indirectly securing a rotor to a shaft. The rotor has at least one through hole along an axial direction of the rotor. A second hole diameter of the at least one through hole at either or both of axial ends of the rotor is greater than a first hole diameter of the at least one through hole at a portion other then the axial ends of the rotor. The rotor securing arrangement includes: a first securing member corresponding to the first hole diameter of the at least one through hole, and a second securing member corresponding to the second hole diameter of the at least one through hole. The first securing member is configured to directly or indirectly secure the rotor to the shaft with at least a portion of the second securing member between the first securing member and the rotor.

This configuration allows the axial end portion (a flange or a head or the like) of the first securing member to be at least partially received in a recess of the second diameter of the second securing member. This can suppress axial lengths of portions of the first and second securing members that protrude from the rotor, thereby minimizing the axial length of the rotor securing arrangement. Further, in the presence of U-shaped winding, an axial length of its U-shaped bottom (on the left hand side of the FIG. 1) can be minimized, which leads to a minimum axial length of the rotating electric machine.

DESCRIPTION OF SPECIFIC EMBODIMENTS

Embodiments of the present invention will now be explained with reference to the accompanying drawings. Each figure illustrates elements necessary to illustrate the invention and doesn't necessarily illustrate the actual all elements. In cross-sectional views, elements necessary to illustrate the invention are illustrated by hatchings for illustrative purposes.

Figure 1:
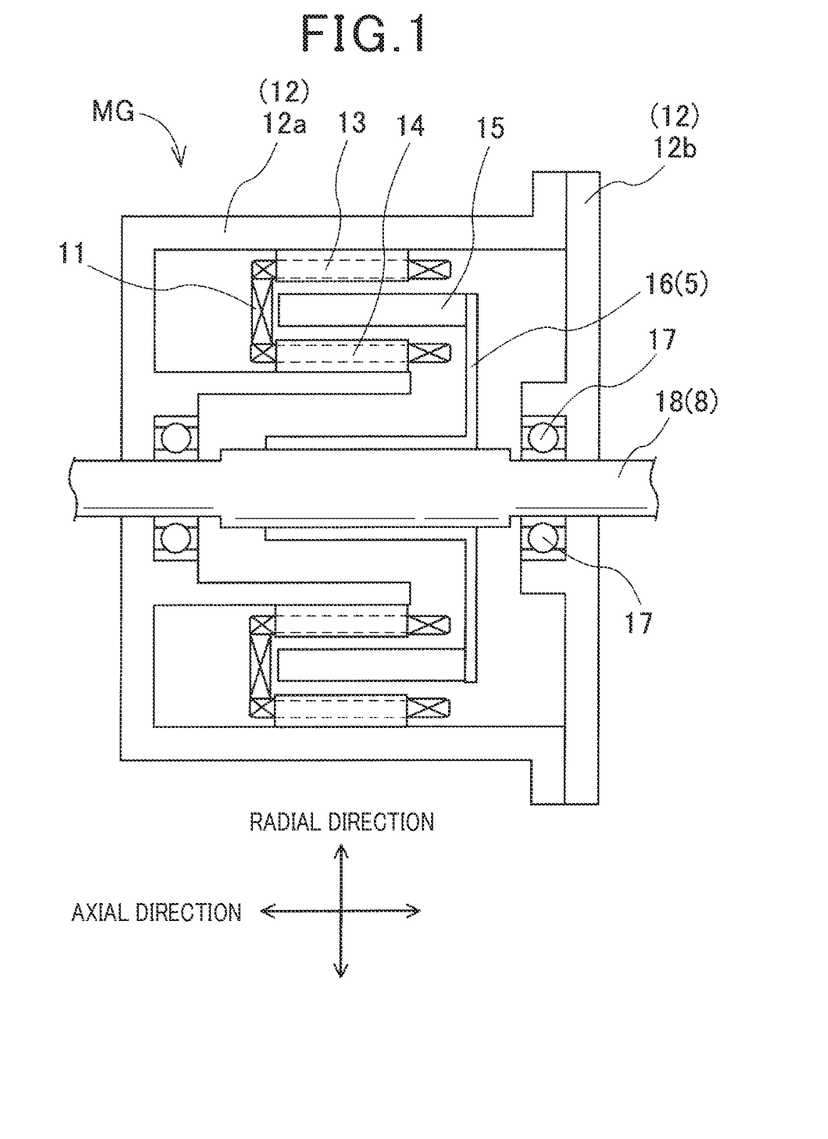
FIG. 1 is a schematic cross-sectional view of a rotating electric machine in accordance with one embodiment of the present invention.

There will now be explained one embodiment of the present invention with reference to FIGS. 1-17. Referring to FIG. 1, a rotating electric machine MG is a double-stator rotating electric machine. The rotating electric machine MG includes, in a casing 12, an outer stator 13, an inner stator 14, a rotor 15, a rotary shaft 18 and others.

The casing 12 is formed of a cup-like casing member 12a and a flat-plate casing member 12b. A bearing 17 is provided between the casing members 12a, 12b and the shaft 18. The shaft 18 is rotatably supported by the casing 12 via the shaft 18.

The outer stator 13 and the inner stator 14 are secured to an inner wall of the casing member 12a in any well-known manner. The winding 11 wound around the outer stator 13 and the inner stator 14 is U-shaped in cross-section as shown in FIG. 1. The U-shaped bottom portion of the winding 11 (on the left hand side of FIG. 1) faces the tip of the rotor 15. The rotation of the rotor 15 needs some clearance between the winding 11 and the rotor 15. Hence, as described later, minimizing the amount of protrusion of the U-shaped bottom portion of the winding 11 from the end face of the rotor 15 may prevent increase of the axial length of the rotating electric machine MG.

The rotor 15 is secured to the shaft 18 via the disc 16. The rotor 15 is secured to the disc 16. Various configurations of the rotor 15 and securing techniques are described later (see FIGS. 2-17). As shown in FIG. 1, the disc 16 is L-shaped along the radial and axial directions and secured to the shaft 18 in any manner.

Figure 2:
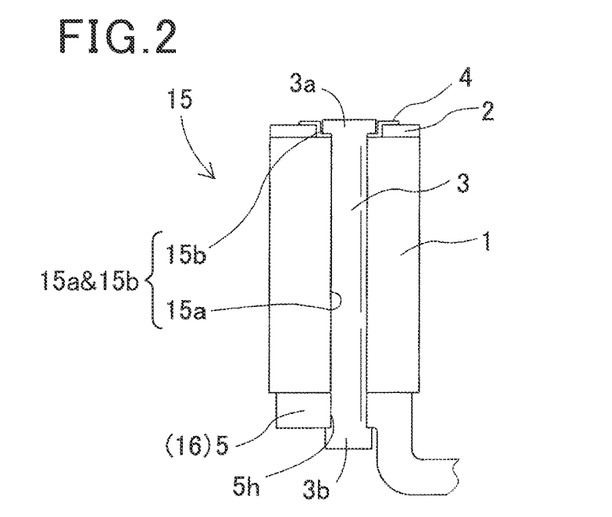
FIG. 2 is a schematic cross-sectional view of a rotor of the embodiment.
Figure 3:
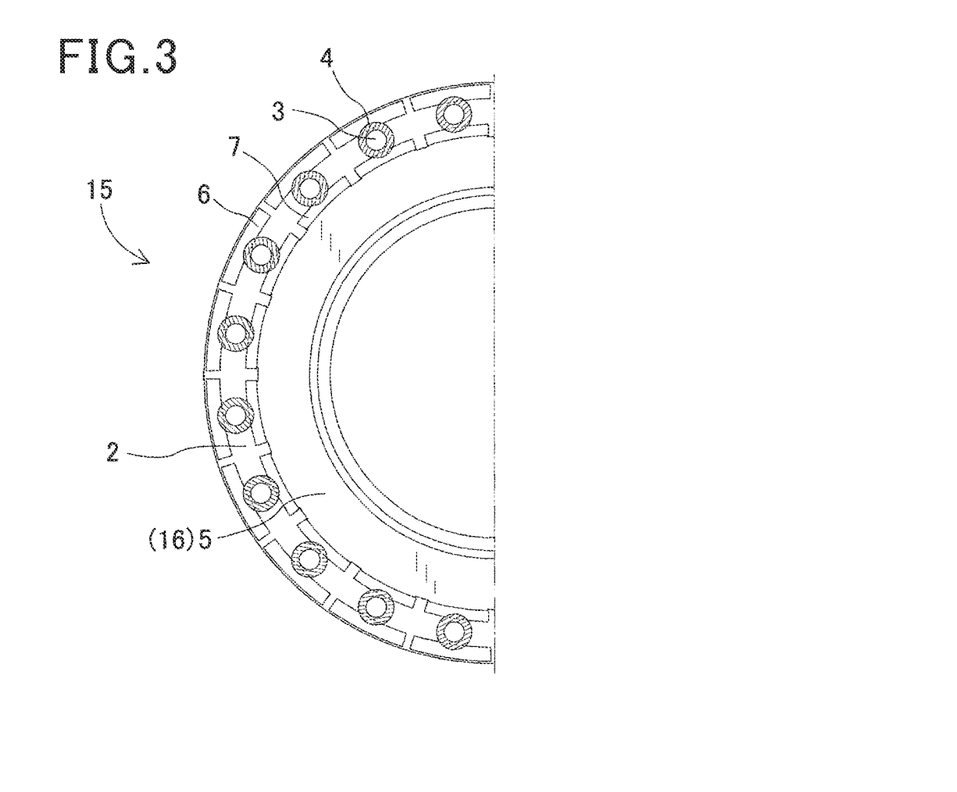
FIG. 3 is a schematic plan view of the rotor of the embodiment.

The rotor 15, as shown in FIGS. 2 and 3, includes a first rotor core 1, a second rotor core 2, a plurality of first securing members 3, and a plurality of second securing members 4 respectively associated with the plurality of first securing members 3. The first rotor core 1 and the second rotor core 2 may be integrated with each other or may be separate from each other. An arrangement of the first rotor core 1 and the second rotor core 2 is hereinafter merely referred to as a rotor core.

Figure 4:
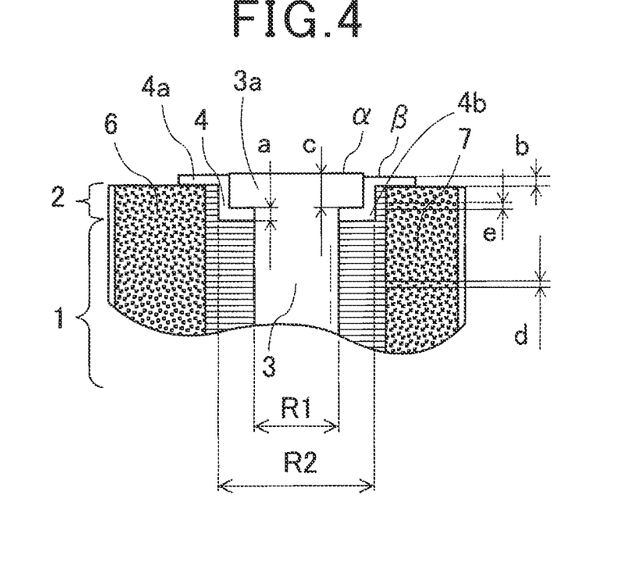
FIG. 4 is a schematic cross-sectional view of a rotor securing arrangement of the embodiment.

As shown in FIG. 2, the first rotor core 1 has a plurality of through holes 15a of a first hole diameter R1 (see FIG. 4). The second rotor core 2 has a plurality of through holes 15b of a second hole diameter R2 greater than the first hole diameter R1 (see FIG. 4). The plurality of through holes 15b are respectively associated with the plurality of through holes 15a. Each pair of through holes 15a, 15b are integrated to form a through hole 15a&15b, where the second rotor core 2 looks like a counter bore.

Each of the first rotor core 1 and the second rotor core 2 forming the rotor core may be a single member or a stack of members or the like. In the present embodiment, as shown in FIG. 3, each of the first rotor core 1 and the second rotor core 2 forming the rotor core may be cylindrically shaped and a stack of magnetic steel plates (made of a magnetic material) with a plurality of through holes 15a&15b on a circumference, through which the plurality of first securing members 3 respectively extend. The number of through holes 15a&15b may be set to any positive integer greater than one. In principle, an embodiment can be envisaged where the rotor core has a single through hole 15a&15b.

Figure 5:
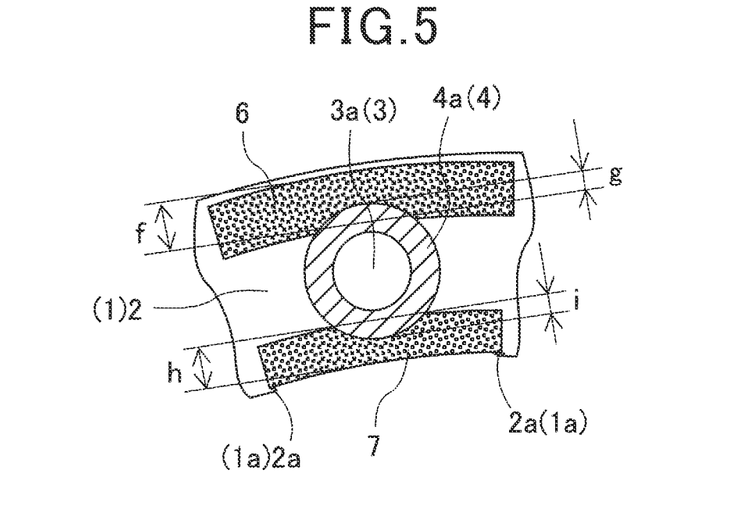
FIG. 5 is a schematic plan view of overlap of a second securing member and a magnet of the embodiment.

Receiving portions (each being a through hole) for receiving outer magnets 6 are provided on an outer periphery of the rotor core (see FIG. 5). Receiving portions (each being a recess and lugs 1a, 2a) for receiving inner magnets 7 are provided on an inner periphery of the rotor core (see FIG. 5). Each inner magnet 7 is put in the recess and the lugs 1a, 2a are then deformed so as to secure the inner magnet 7 in the recess.

The number of pairs of outer and inner magnets 6, 7 (hereinafter referred to as a magnet number) may be a pole pair number, or may be increased by dividing each magnet. In FIG. 3, each of the first securing members 3 extending through one of the through holes 15a&15b is provided between one of the pairs of the outer magnet 6 and the inner magnet 7. In such a case, the magnet number is equal to the number of through holes 15a&15b. Alternatively, the magnet number may be set less than the number of through holes 15a&15b, where the number of operations of securing each magnet to the rotor core may be reduced.

The first securing members 3 are provided to secure the rotor 15 to a disc 5 that is an example of disc 16 shown in FIG. 1. Each first securing member 3 is a rod-like member having at least a flange 3a. The securing member 3 may be made of any material. Preferably, the securing member 3 may be made of a magnetic material for facilitating passing of magnetic flux therethrough. As shown in FIG. 2, for each pair of the first and second securing members 3, 4, the first securing member 3 extends through the through hole 15a&15b with the second securing member 4 receiving the flange 3a. The first securing member 3 further extends through a through hole 5h in the disc 5 coaxially aligned with the through hole 15a&15b. The first securing member 3 includes the flange 3a at a distal end (or anti-disk side end) of the first securing member 3 or the one end side of the rotor 15 (see the upper end portion of FIG. 2) and a crimp 3b formed by being deformed at a proximal end (or disk side end) of the first securing member 3. In the present embodiment, the rotor 15 is thus indirectly secured to the shaft 18 through the disc 5 (see FIG. 1).

The second securing member 4 is made of a magnetic material and includes a seat portion 4a (as a flange) and a stepped portion 4b and others. The second securing member 4 may be made of any material. Preferably, the second securing member 4 may be made of a magnetic material for facilitating passing of magnetic flux therethrough. The seat portion 4a presses upon the second rotor core 2 and the outer magnet 6 to secure them to the disc 5. The stepped portion 4b that is stepped down from the seat portion 4a presses upon the first rotor core 1 to secure it to the disc 5. The stepped portion 4b has a through hole that is a portion of the through hole 15b.

FIGS. 4 and 5 show an example of arrangement of elements of the rotor 15 with example dimensions of the elements indicated. In FIG. 4, the second securing member 4 includes a portion between the flange 3a and the first rotor core 1, of a thickness a referred to as a first seat thickness, and a portion pressing upon the second rotor core 2, of thickness b referred to as a second seat thickness. The flange 3a of the first securing member 3 is of a thickness c referred to as a head thickness. Each steel plate of the first rotor core 1 is of a thickness d referred to as a first plate thickness. Each steel plate of the second rotor core 2 is of a thickness e referred to as a second plate thickness.

As shown in FIG. 5, the outer magnet 6 is of a radial thickness f referred to as an outer magnet radial width. The inner magnet 7 is of a radial thickness h referred to as an inner magnet radial width. A region in which the seat portion 4a of the second securing member 4 overlaps the outer magnet 6 is of a radial width g referred to as an outer overlap width (as a first overlap width). A region in which the seat portion 4a of the second securing member 4 overlaps the inner magnet 7 is of a radial width i referred to as an inner overlap width (as a first overlap width). Using these definitions of dimensions, the rotor 15 of the present embodiment may be configured to satisfy at least one of the following conditions.

(i) First Condition: a>b, d

A first condition is defined such that the first seat thickness a is greater than the second seat thickness b and greater than the first plate thickness d. Reducing the second seat thickness b can reduce an axial dead space. Increasing the first seat thickness a can prevent occurrence of buckling of the flange 3a.

(ii) Second Condition: c>b

A second condition is defined such that the head thickness c is greater than the second seat thickness b. The flange 3a of the first securing member 3 presses upon the first rotor core 1 and the second rotor core 2 to secure them to the disc 5. The seat portion 4a of the second securing member 4 presses only upon the second rotor core 2 to secure it to the disc 5. Setting the head thickness c greater than the second seat thickness b can prevent damage to the flange 3a.

(iii) Third Condition: d≈e (Preferably, d=e)

A third condition is defined such that the first plate thickness d is set approximately equal to the second plate thickness e. That is, the first plate thickness d is equal to the second plate thickness e within an acceptable error range, such as a manufacturing tolerance, an engineering tolerance or other predetermined error range which may cause no practical problems. The through hole 15a in the first rotor core 1 is of the first hole diameter R1 and the through hole 15b in the second rotor core 2 is of the second hole diameter R2. Setting the first plate thickness d of each of the steel plates forming the first rotor core 1 and the second plate thickness e of each of the steel plates forming the second rotor core 2 approximately equal to each other allows the same shaping die to be used in pressing the steel plates to form the first rotor core 1 and pressing the steel plates to form the first rotor core 2, thereby facilitating formation of the rotor core 15.

(iv) Fourth Condition: α=β (Preferably, α=β; δ=|α−β|)

A fourth condition is defined such that an axial position α of a first axial end face of the first securing member 3 (more specifically, the flange 3a) and an axial position β of a second axial end face of the second securing member 4 (more specifically, the seat portion 4a) are substantially equal to each other. More specifically, the axial position α and the axial position β are equal to each other within an acceptable error range δ. The predefined acceptable range δ may be set to any non-negative value. Preferably, the axial position α and the axial position β may be set equal to each other (where δ=0). That is, the first axial end face of the first securing member 3 and the second axial end face of the second securing member 4 may be coplanar. Equalizing the axial position α of the first axial end face of the first securing member 3 and the axial position β of the second axial end face of the second securing member 4 as much as possible can reduce an amount of protrusion of the flange 3a and the seat portion 4a from the distal end face of the rotor 15, thereby reducing the axial dead space.

(v) Fifth Condition: g≤f/2

A fifth condition is defined such that the outer overlap width g as measured along the radial direction from the axial center of the rotor 15 is equal to or less than one-half of the outer magnet radial width f. This condition can prevent magnetic leakage from the outer magnet 6 through the seat portion 4a, thereby preventing performance degradation.

(vi) Sixth Condition: i≤h/2

A sixth condition is defined such that the inner overlap width i as measured along the radial direction from the axial center of the rotor 15 is equal to or less than one-half of the inner magnet radial width h. This condition can prevent magnetic leakage from the inner magnet 7 through the seat portion 4a, thereby preventing performance degradation.

Figure 6:
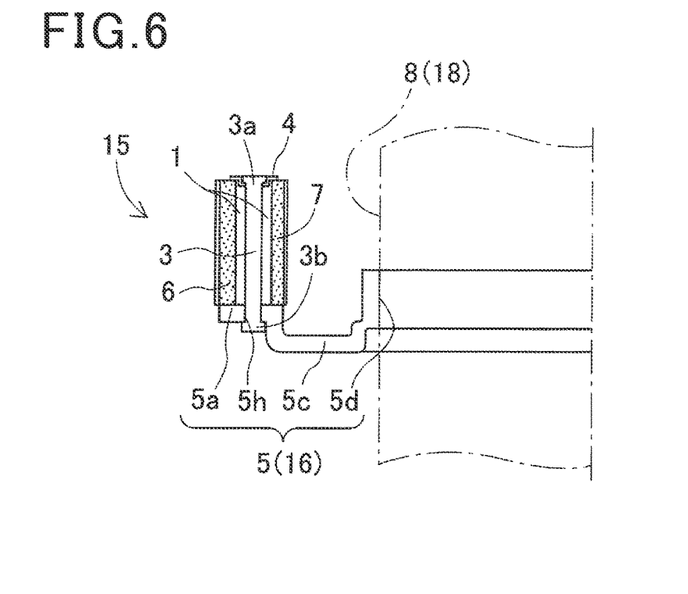
FIG. 6 is a schematic cross-sectional view of a disc of the embodiment.

Referring to FIG. 6, the disc 5 includes a secured portion 5a, a disc body 5c, a through hole 5d and others. The disc body 5c is an annular flat-plate portion of the disc 5. The secured portion 5a is provided on an outer periphery of the disc body 5c to secure the rotor 15 thereto. The secured portion 5a has a through hole 5h that is also shown in FIG. 2. The through hole 5d is provided on an inner periphery of the disc body 5c. The disc 5 is formed along the shaft 8 indicated by the dashed line. The disc 5 may be made of any material. Preferably, the disc 5 may be made of a non-magnetic material to prevent the magnetic leakage as described regarding the fifth or sixth condition.

The rotor 15 described above is in a basic configuration. Several modifications of the rotor 15 will now be explained with reference to FIGS. 6-17.

(First Modification)

Figure 7:
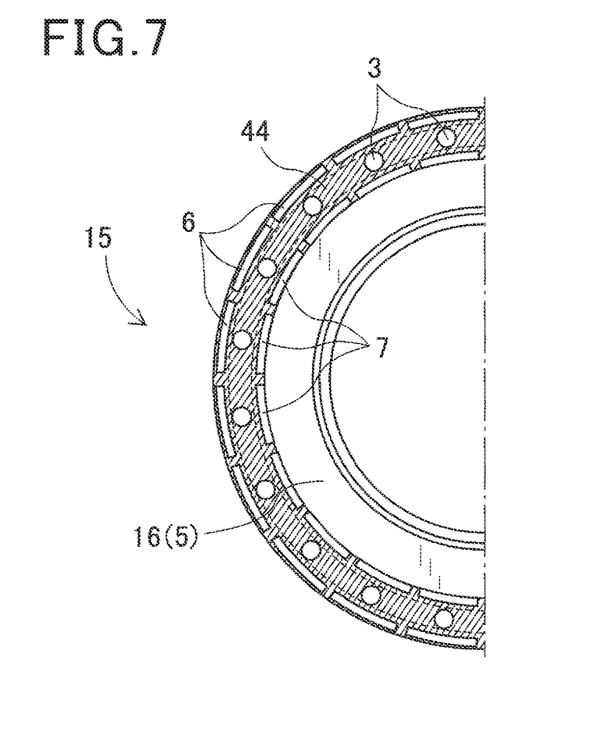
FIG. 7 is a schematic plan view of a rotor securing arrangement in accordance with a first modification of the embodiment.
Figure 8:
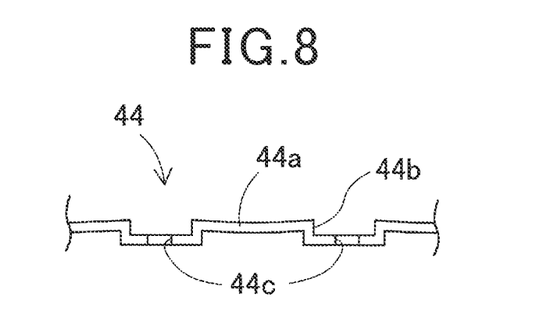
FIG. 8 is a schematic side view of a second securing member of the first modification of the embodiment.
Figure 9:
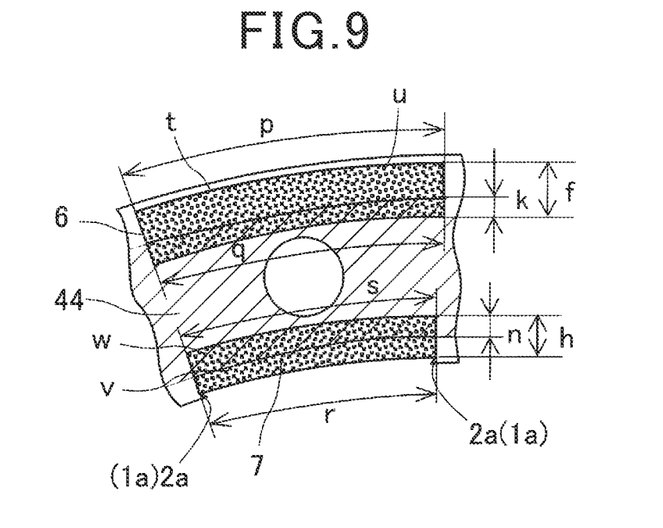
FIG. 9 is a schematic plan view of overlap of the second securing member and a magnet of the first modification of the embodiment.

In a first modification of the embodiment set forth above, a second securing member 44 as shown in FIGS. 7-9 is used in place of the second securing member 4 as shown in FIGS. 2-5. The second securing member 44 is similar to the second securing member 4 except that they are different in shape. The second securing member 44 is an elongated plate-like member extending over two or more poles of the rotor 15. The second securing member 44 as shown in FIG. 7 is an annular flat-plate member extending over a plurality of poles.

Referring to FIG. 8, the second securing member 44 includes a body 44a, a plurality of recesses 44b, a plurality of through holes 44c and others. The body 44a is an elongated plate-like portion. Each recess 44b is formed in a portion of the body 44a corresponding to one of the first securing members 3 (through hole 15a&15b) and is configured to fit within the through hole of the second diameter R2 in the second rotor core 2. The through hole 44c is a through hole through which the first securing member 3 extends and is a portion of the through hole 15b shown in FIG. 2.

FIG. 9 shows an example of arrangement of the second securing member 44 in the rotor 15 with dimensions indicated. In FIG. 9, a region of the outer magnet 6 in which the second securing member 44 overlaps the outer magnet 6 is of a radial width k referred to as an outer overlap width (as a second overlap width). A radial cross-sectional area of the outer magnet 6 is an outer magnet cross-sectional area t. The region of the outer magnet 6 in which the second securing member 44 overlaps the outer magnet 6 has an outer overlap cross-sectional area u. In addition, a region of the outer magnet 6 in which the second securing member 44 doesn't overlap the outer magnet 6 has an outer non-overlap circumferential width p referred to as an outer non-overlap circumferential width. The region of the outer magnet 6 in which the second securing member 44 overlaps the outer magnet 6 has an inner circumferential width q referred to as an inner overlap circumferential width.

A region of the inner magnet 7 in which the second securing member 44 overlaps the inner magnet 7 is of a radial width n referred to as an inner overlap width (as a second overlap width). A radial cross-sectional area of the inner magnet 7 is an inner magnet cross-sectional area v. The region of the inner magnet 7 in which the second securing member 44 overlaps the inner magnet 7 has an inner overlap cross-sectional area w. In addition, a region of the inner magnet 7 in which the second securing member 44 doesn't overlap the inner magnet 7 has an inner circumferential width r referred to as an inner non-overlap circumferential width. The region of the inner magnet 7 in which the second securing member 44 overlaps the inner magnet 7 has an outer circumferential width s referred to as an inner overlap circumferential width. Using these definitions of dimensions, the rotor 15 of the present modification may be configured to satisfy at least one of the following conditions.

(vii) Seventh Condition: $k \leq f/2$

A seventh condition is defined such that the outer overlap width k as measured along the radial direction from the axial center of the rotor 15 is equal to or less than one-half of the outer magnet radial width f. This condition can prevent magnetic leakage from the outer magnet 6 through the seat portion 4a, thereby preventing performance degradation.

(viii) Eighth Condition: $n \leq h/2$

An eighth condition is defined such that the inner overlap width n as measured along the radial direction from the axial center of the rotor 15 is equal to or less than one-half of the inner magnet radial width h. This condition can prevent magnetic leakage from the inner magnet 7 through the seat portion 4a, thereby preventing performance degradation.

(ix) Ninth Condition: $p \approx q$ (Preferably, $p=q$)

A ninth condition is defined such that, for the outer magnet 6, the outer non-overlap circumferential width p is approximately equal to the inner overlap circumferential width q. That is, the outer non-overlap circumferential width p is equal to the inner overlap circumferential width q within an acceptable error range. It is not taken into account the fact that the circumferential width of the outer magnet 6 changes as a function of a radial distance from the axial center of the rotor core 15. This condition can prevent magnetic leakage from the outer magnet 6 through the seat portion 4a, thereby preventing performance degradation.

(x) Tenth Condition: $s \approx r$ (Preferably, $s=r$)

A tenth condition is defined such that, for the inner magnet 7, the inner overlap circumferential width s is approximately equal to the inner non-overlap circumferential width r. That is, the inner overlap circumferential width s is equal to the inner non-overlap circumferential width r within an acceptable error range. It is not taken into account the fact that the circumferential width of the inner magnet 7 changes as a function of a radial distance from the axial center of the rotor core 15. This condition can prevent magnetic leakage from the inner magnet 7 through the seat portion 4a, thereby preventing performance degradation.

(xi) Eleventh Condition: $u \leq t/2$

An eleventh condition is defined such that, for the outer magnet 6, the outer overlap cross-sectional area u is equal to or less than one-half of the outer magnet cross-sectional area t. This condition can prevent magnetic leakage from the outer magnet 6 through the seat portion 4a, thereby preventing performance degradation.

(xii) Twelfth Condition: $w \leq v/2$

A twelfth condition is defined such that, for the inner magnet 7, the inner overlap cross-sectional area w is equal to or less than one-half of the inner magnet cross-sectional area v. This condition can prevent magnetic leakage from the outer magnet 6 through the seat portion 4a, thereby preventing performance degradation.

(Second Modification)

Figure 10:
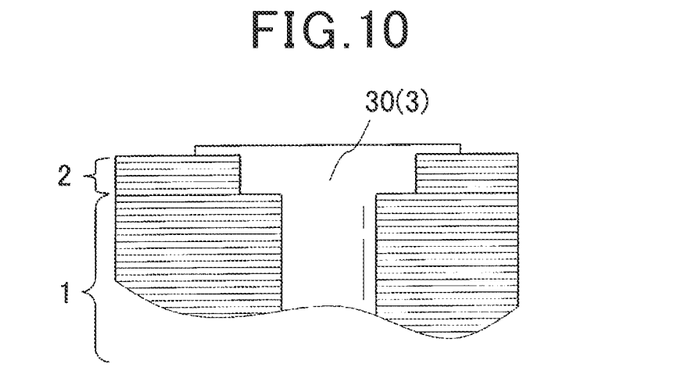
FIG. 10 is a schematic cross-sectional view of a rotor securing arrangement in accordance with a second modification of the embodiment.

In a second modification of the embodiment set forth above, a securing member 30 as shown in FIG. 10 is used in place of the first securing member 3 and the second securing member 4 as shown in FIGS. 2-5. The securing member 30 is a single member that integrates the first securing member 3 and the second securing member 4. Use of the securing member 30 can reduce the number of components, thereby reducing the number of operations for securing the rotor 15 to the disc 5.

(Third Modification)

Figure 11:
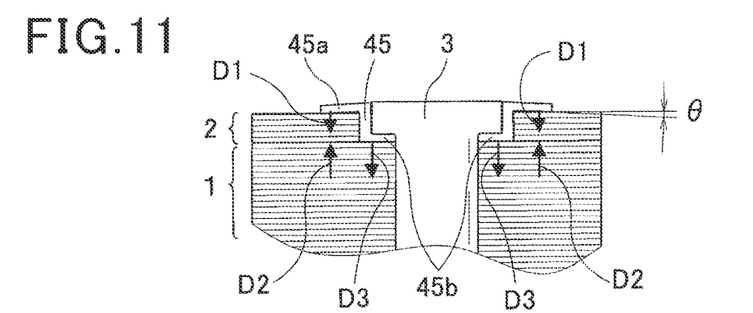
FIG. 11 is a schematic cross-sectional view of a rotor securing arrangement in accordance with a third modification of the embodiment.

In a third modification of the embodiment set forth above, a second securing member 45 as shown in FIG. 11 is used in place of the second securing member 4 as shown in FIGS. 2-5. The second securing member 45 includes a tapered portion 45a corresponding to the seat portion 4a and a stepped portion 45b corresponding to the stepped portion 4b. The tapered portion 45a is inclined at an angle θ relative to the end face of the rotor 15 (more specifically, the end face of the second rotor core 2). A core-side surface of the tapered portion 45a (a lower side surface of the tapered portion 45a in FIG. 11) and a anti-core-side surface of the tapered portion 45a (an upper side surface of the tapered portion 45a in FIG. 11) may be parallel with each other. A portion of the tapered portion 45a (right and left ends in FIG. 11) presses upon the second rotor core 2. As with the stepped portion 4b, the stepped portion 45b presses upon the first rotor core 1.

The stepped portion 45b presses upon the first rotor core 1 in a direction indicated by the arrow D3, which may cause a lifting force in a direction indicated by an arrow D2 to be exerted on a portion of the first rotor core 1 that is not pressed by the stepped portion 45b. The tapered portion 45a can press upon the first rotor core 1 in a direction indicated by the arrow D1 through the second rotor core 2. Since the tapered portion 45a is inclined at the angle θ relative to the end face of second rotor core 2, a springback force of the tapered portion 45a will be exerted on the second rotor core 2, thereby more reliably securing the rotor 15 to the disc 5.

(Fourth Modification)

Figure 12:
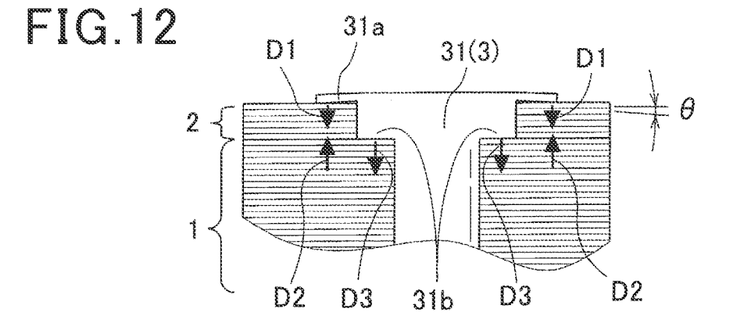
FIG. 12 is a schematic cross-sectional view of a rotor securing arrangement in accordance with a fourth modification of the embodiment.

In a fourth modification of the embodiment set forth above, a securing member 31 as shown in FIG. 12 is used in place of the first securing member 3 and the second securing member 45 as shown in FIG. 11. The first securing member 31 is a single member that integrates the first securing member 3 and the second securing member 45. The securing member 31 includes a tapered portion 31a corresponding to the tapered portion 45a and a stepped portion 31b corresponding to the stepped portion 45b. Use of the securing member 31 can reduce the number of components, thereby reducing the number of operations for securing the rotor 15 to the disc 5. In addition, the fourth modification can provide similar advantages to those of the third modification.

(Fifth Modification)

Figure 13:
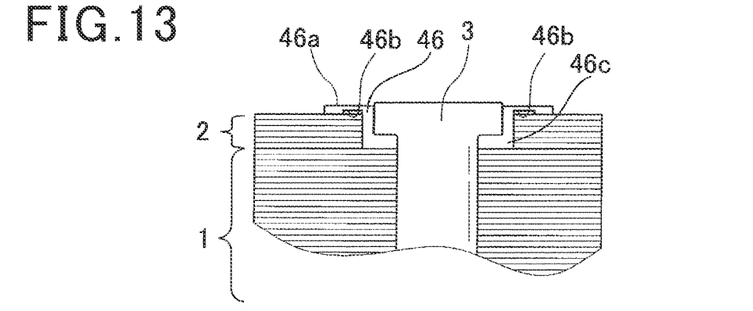
FIG. 13 is a schematic cross-sectional view of a rotor securing arrangement in accordance with a fifth modification of the embodiment.

In a fifth modification of the embodiment set forth above, a second securing member 46 as shown in FIG. 13 is used in place of the second securing member 4 as shown in FIGS. 2-5. The second securing member 46 includes a seat portion 46a corresponding to the seat portion 4a and a stepped portion 46c corresponding to the stepped portion 4b. The seat portion 46a includes a contact portion in contact with the end face of the rotor 15 (more specifically, the end face of the second rotor core 2) and a recessed portion 46b recessed out of contact with the end face of the rotor 15 (more specifically, the end face of the second rotor core 2). The contact portion of the seat portion 46a (right and left ends in FIG. 13) presses upon the second rotor core 2. As with the stepped portion 4b, the stepped portion 46c presses upon the first rotor core 1. With the recessed portion 46b, a springback force of the seat portion 46a will be exerted on the second rotor core 2, thereby more reliably securing the rotor 15 to the disc 5. second rotor core 2.

(Sixth Modification)

Figure 14:
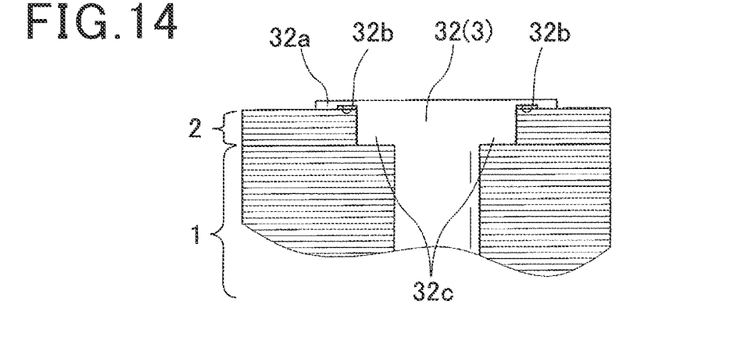
FIG. 14 is a schematic cross-sectional view of a rotor securing arrangement in accordance with a sixth modification of the embodiment.

In a sixth modification of the embodiment set forth above, a securing member 32 as shown in FIG. 14 is used in place of the first securing member 3 and the second securing member 46 as shown in FIG. 13. The securing member 32 is a single member that integrates the first securing member 3 and the second securing member 46. The securing member 32 includes a seat portion 32a corresponding to the seat portion 46a and a stepped portion 32c corresponding to the stepped portion 46c. The seat portion 32a includes a recessed portion 32b corresponding to the recessed portion 46b. Use of the securing member 32 can reduce the number of components, thereby reducing the number of operations for securing the rotor 15 to the disc 5. In addition, the sixth modification can provide similar advantages to those of the fifth modification.

(Seventh Modification)

Figure 15:
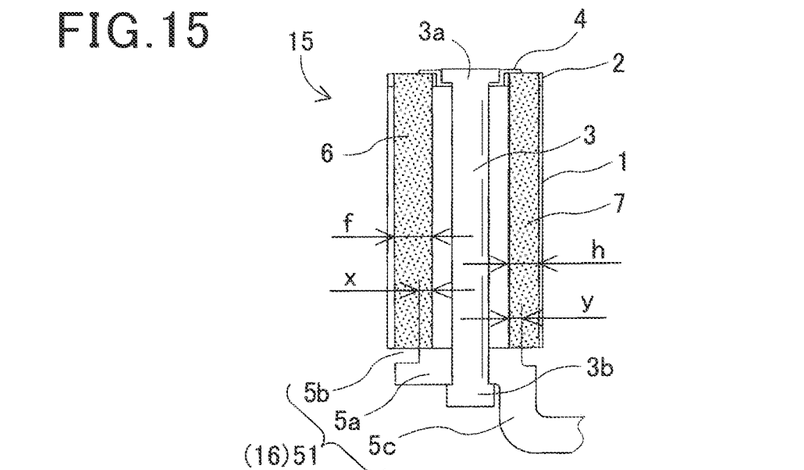
FIG. 15 is a schematic cross-sectional view of a rotor in accordance with a seventh modification of the embodiment.

In a seventh modification of the embodiment set forth above, a disc 51 as shown in FIG. 15 is used in place of the disc 5 as shown in FIGS. 2 and 6. The disc 51 corresponding to the disc 16 as shown in FIG. 1 includes a secured portion 5a, a recess 5b, a disc body 5c and others. The recess 5b is a portion of the secured portion 5a recessed toward the first securing member 3.

A region in which the secured portion 5a overlaps the outer magnet 6 is of a radial width x referred to as an outer overlap width. A region in which the secured portion 5a overlaps the inner magnet 7 is of a radial width y referred to as an inner overlap width. Using these definitions of dimensions, the rotor 15 and the disc 51 of the present embodiment may be configured to satisfy at least one of the following conditions.

(xiii) Thirteenth Condition: $x \leq f/2$

A thirteenth condition is defined such that the outer overlap width x as measured along the radial direction from the axial center of the rotor 15 is equal to or less than one-half of the outer magnet radial width f. This condition can prevent magnetic leakage from the outer magnet 6 through the seat portion 4a, thereby preventing performance degradation.

(xiv) Fourteenth Condition: $y \leq h/2$

A fourteenth condition is defined such that the inner overlap width y as measured along the radial direction from the axial center of the rotor 15 is equal to or less than one-half of the inner magnet radial width h. This condition can prevent magnetic leakage from the inner magnet 7 through the seat portion 4a, thereby preventing performance degradation.

(Eighth Modification)

Figure 16:
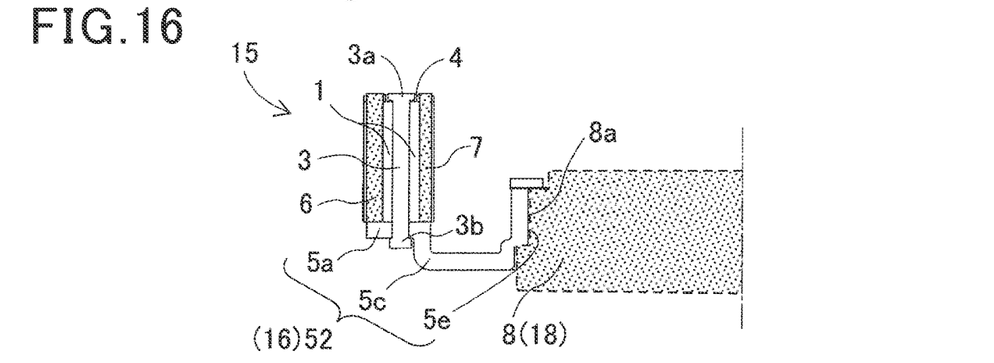
FIG. 16 is a schematic cross-sectional view of a disc in accordance with an eighth modification of the embodiment.

In an eighth modification of the embodiment set forth above, a disc 52 as shown in FIG. 16 is used in place of the disc 5 as shown in FIGS. 2 and 6. The disc 52 corresponding to the disc 16 as shown in FIG. 1 includes a secured portion 5a, a disc body 5c, a socket portion 5e and others. The socket portion 5e is provided on the shaft 8 side of the disc body 5c, to which a spigot portion 8a of the shaft 8 is mated. The socket portion 5e is made of the same material as the shaft 8, which can eliminate looseness between the disc 52 and the shaft 8 even when the linear expansion occurs after the spigot portion 8a of the shaft 8 is mated to the socket portion 5e of the disc 52.

(Ninth Modification)

Figure 17:
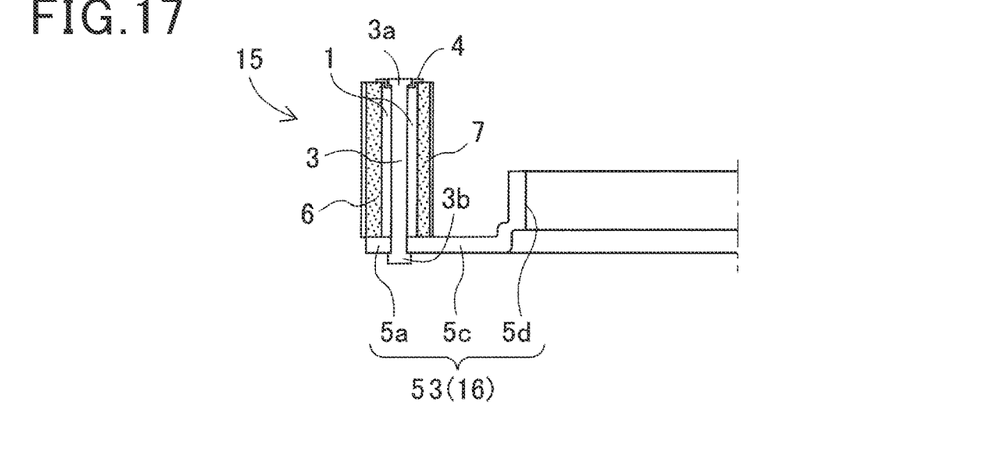
FIG. 17 is a schematic cross-sectional view of a disc in accordance with a ninth modification of the embodiment.

In a ninth modification of the embodiment set forth above, a disc 53 as shown in FIG. 17 is used in place of the disc 5 as shown in FIGS. 2 and 6. The disc 53 corresponding to the disc 16 as shown in FIG. 1 includes a secured portion 5a, a disc body 5c and others. The disc 53 is different from the disc 5 in that the secured portion 5a and the disc body 5c are coplanar. This allows the outer magnet 6 and the inner magnet 7 to be axially extended (in the vertical direction in FIG. 17), which can increase magnetic forces.

(Other Modifications)

It is contemplated that any combination of two or more of the second securing member 44 of the first modification, the securing member 30 of the second modification, the second securing member 45 of the third modification, the securing member 31 of the fourth modification, the second securing member 46 of the fifth modification, the securing member 32 of the sixth modification, the disc 51 of the seventh modification, the disc 52 of the eighth modification, and the disc 53 of the ninth modification may be applied.

(Other Embodiments)

While the present invention has been described with respect to a limited number of embodiments as above, those skilled in the art will appreciate numerous other embodiments. There will now be explained some other embodiments that may be devised without departing from the spirit and scope of the present invention.

Figure 18:
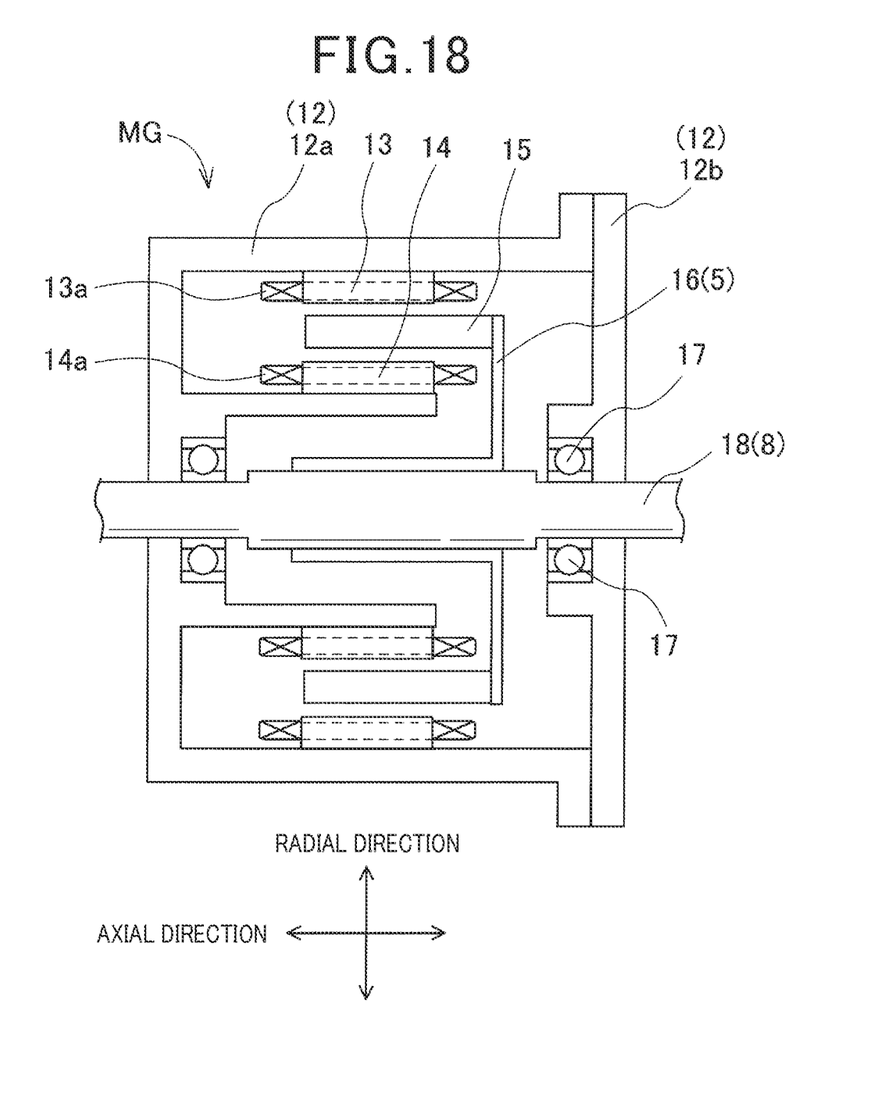
FIG. 18 is a schematic cross-sectional view of a rotating electric machine in accordance with another embodiment of the present invention.

In the embodiments described above, the winding 11 is wound around both the outer stator 13 and the inner stator 14 such that the winding 11 is U-shaped in cross-section (see FIG. 1). Alternatively, as shown in FIG. 18, windings may be individually wound around the outer stator 13 and the inner stator 14. More specifically, in FIG. 18, the winding 13a may be wound around the outer stator 13, and the winding 14a may be wound around the inner stator 14. Such an embodiment is different from the above embodiments in winding configuration. Therefore, such an embodiment can provide similar advantages to those of the above embodiments.

Figure 19:
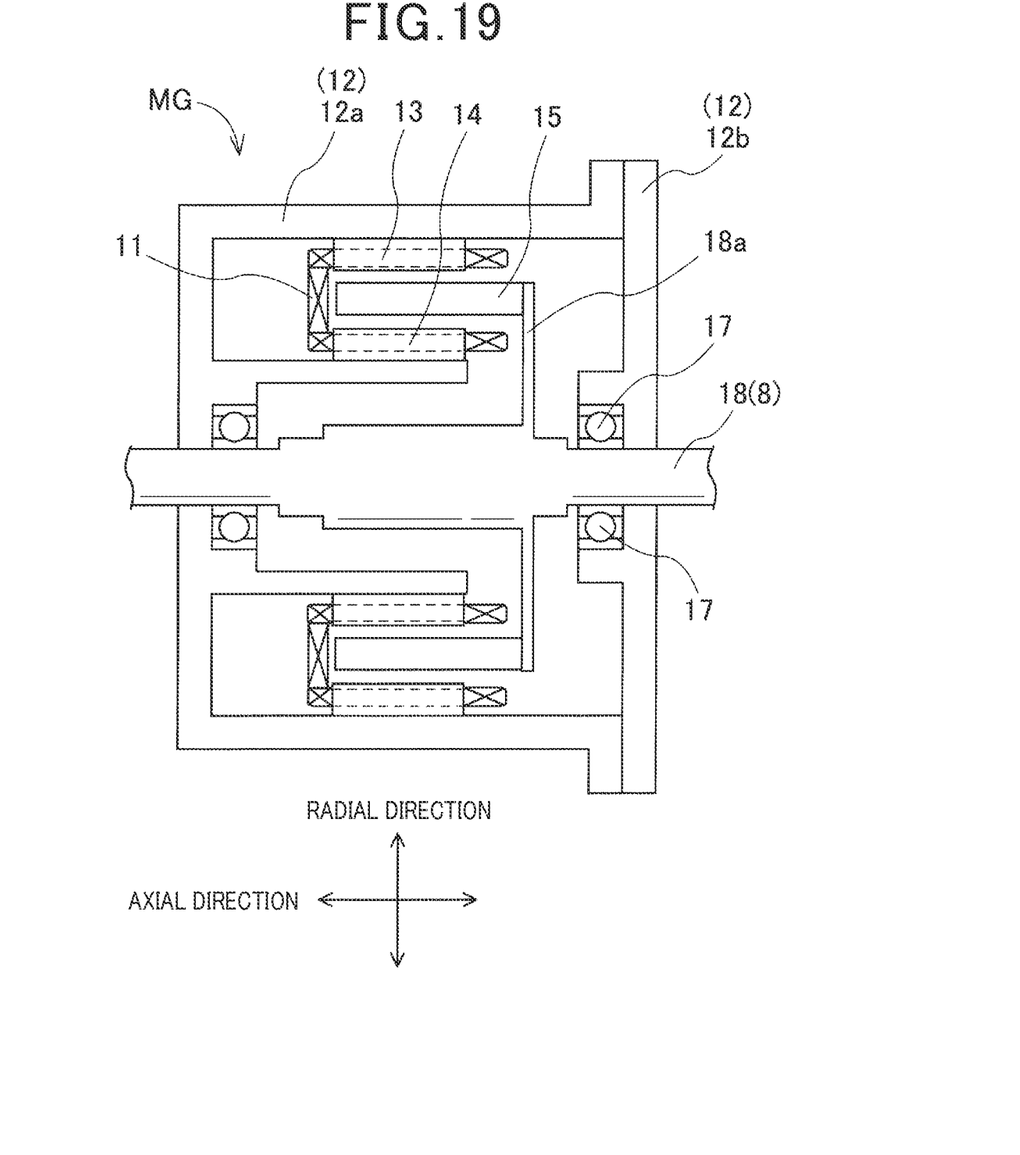
FIG. 19 is a schematic cross-sectional view of a rotating electric machine in accordance with another embodiment of the present invention.

In the embodiments described above, the disc 16 and the shaft 18 are separate members, and the disc 16 is secured to the shaft 18 (see FIG. 1). Alternatively, as shown in FIG. 19, the shaft 18 may include a disc portion 18a. The disc portion 18a corresponds to the disc 16. That is, as shown in FIG. 19, the disc 16 and the shaft 18 may be integrated with each other, where the rotor 15 may be directly secure to the shaft 18. Such an embodiment is different from the above embodiments in that the disc 16 and the shaft 18 are integrated with each other. Therefore, such an embodiment can provide similar advantages to those of the above embodiments.

Figure 20:
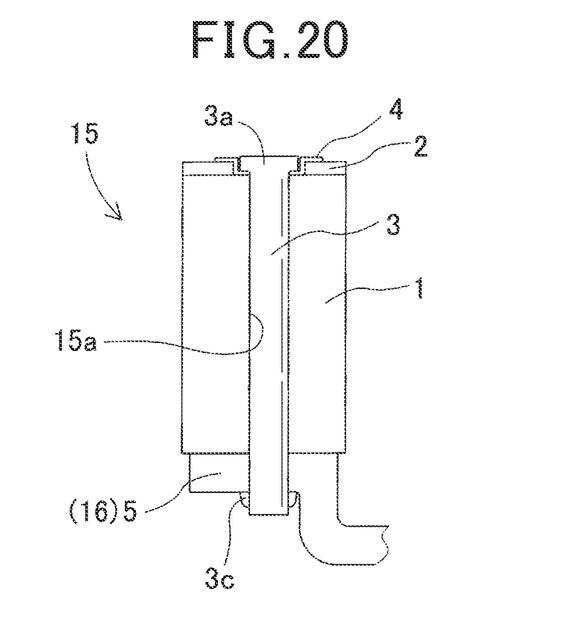
FIG. 20 is a schematic cross-sectional view of a rotor in accordance with another embodiment of the present invention.
Figure 21:
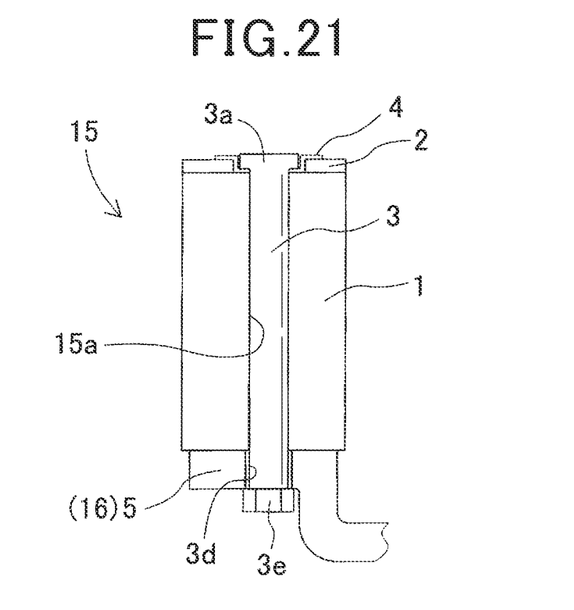
FIG. 21 is a schematic cross-sectional view of a rotor in accordance with another embodiment of the present invention.

In the embodiments described above, the rotor 15 is secured to the disc 5(16) by inserting the first securing member 3 through the through hole 15a&15b and then forming the crimp 3b (see FIGS. 2 and 6). Alternatively, the rotor 15 may be secured to the disc 5(16) by inserting the first securing member 3 through the through hole 15a&15b and then forming a junction 3c as shown in FIG. 20. Still alternatively, the rotor 15 may be secured to the disc 5(16) by inserting the first securing member 3 through the through hole 15a&15b and then forming a fasteners 3d, 3e as shown in FIG. 21. These alternative embodiments are different from the above embodiments only in securing manner. Therefore, these alternative embodiments can provide similar advantages to those of the above embodiments.

The junction 3c as shown in FIG. 20 is a junction between the disc 5 and the first securing member 3. For example, the junction may be formed by laser welding or arc welding.

The fasteners 3d, 3e may be configured such that, as shown in FIG. 21, a threaded bolt as the first securing member 3 is screwed in a threaded aperture 3d provided in the disc 5. Still alternatively, the fasteners 3e, 3d may be configured such that, as shown in FIG. 21, a threaded bolt as the first securing member 3 is inserted through the threaded aperture 3d and then fastened with a nut 3e.

Although not shown in the drawings, the rotor 15 may be secured to the disc 5(16) by using any combination of two or more of different securing means, such as the crimp 3b, the junction 3c, and the fasteners 3d, 3e. The securing means may be applied to the disc 5 or to the flange 3a or to both of them. This can reduce the axial length of the stator as compared with the conventional stators and allows the rotor 15 to be more reliably secured to the disc 5(16).

In the embodiments described above, the inner magnet 7 is secured to the rotor core (the assembly of the first rotor core 1 and the second rotor core 2) by placing the inner magnet 7 in a recess and deforming lugs 1a, 2a onto the inner magnet 7 (see FIG. 5). Alternatively, the inner magnet 7 may be secured to the rotor core (the assembly of the first rotor core 1 and the second rotor core 2) by providing a plate member between the inner magnet 7 and the lugs 1a, 2a, where the lugs may be deformed or may not be deformed.

In the embodiments described above, the casing 12 is formed of a cup-like casing member 12a and a flat-plate casing member 12b (see FIG. 1). Alternatively, the casing member 12a may be in a shape other than a cup. The casing member 12b may be in a shape other than a flat plate. That is, the casing members 12a, 12b may be in any shape that allows accommodating the outer stator 13, the inner stator 14, the rotor 15, and the shaft 18. These alternative embodiments are different from the above embodiments only in shape. Therefore, these alternative embodiments can provide similar advantages to those of the above embodiments.

(Advantages of the Embodiment)

The embodiments set forth above can provide the following advantages.

(1) In the rotor securing arrangement for directly or indirectly securing the rotor 15 to the shaft 18, the rotor 15 has at least one through hole 15a&15b along a axial direction of the rotor. A second hole diameter R2 of the at least one through hole 15a&15b at either or both of axial ends of the rotor 15 is greater than a first hole diameter R1 of the at least one through hole 15a&15b at a portion other than the axial ends of the rotor 15. The rotor securing arrangement includes the first securing member 3(30,31,32) corresponding to the first hole diameter R1 of the at least one through hole 15a&15b, and the second securing member 4(44,45,46) corresponding to the second hole diameter R2 of the at least one through hole 15a&15b. The first securing member 3(30,31,32) is configured to directly or indirectly secure the rotor 15 to the shaft 18 with at least a portion of the second securing member 4(44,45,46) between the first securing member and the rotor 15 (see FIGS. 1-17). This configuration allows the axial end portion (the flange 3a or the head or the like) of the first securing member 3(30, 31, 32) to be at least partially received in a recess of the second securing member 4(44). This can suppress axial lengths of portions of the first and second securing members that protrude from the rotor 15, thereby minimizing the axial length of the rotor securing arrangement, and thus the axial length of the rotating electric machine (MG). Further, in the presence of U-shaped winding 11, an axial length of its U-shaped bottom (on the left hand side of the FIG. 1) can be minimized, which leads to a minimum axial length of the rotating electric machine.

(2) The rotor 15 is formed of the first rotor core 1 corresponding to the first hole diameter R1 and the second rotor core 2 corresponding to the second hole diameter R2 (see FIG. 4). In this configuration, the rotor core can be formed by combining two rotor cores such that their respective holes are of different hole diameters, which may facilitates manufacturing.

(3) The first securing member 3 includes the flange 3a of a greater diameter than the first hole diameter R1 for pressing upon the second securing member 4. The second securing member 4 includes the seat portion 4a of a greater diameter than the second hole diameter R2 for pressing upon the rotor 15. The thickness of the flange 3a (head thickness c) may be set greater than the thickness of the seat portion 4a (second seat thickness b) (which is the second condition; see FIG. 4). In this configuration, the first securing member 3 presses upon the rotor core through the second securing member 4 including the seat portion 4a. This can prevent the seat portion 4a from being deformed, thereby providing stable securing capability.

(4) The second securing member 44 is an elongated plate-like member extending over two or more poles of the rotor 15 (see FIGS. 7 and 8). Although not shown, the second securing member 44 may be configured to extend over all the poles of the rotor 15. With this configuration, the second securing member 44 itself acts as a magnetic circuit of the rotor core, which improves the output performance.

(5) The axial end face of the first securing member 3 (at the axial position α) and the axial end face of the second securing member 4 (the axial position β) are coplanar or stepped from each other by an axial distance equal to or less than the predefined acceptable range δ. With this configuration, equalizing, in axial position, the first axial end face of the first securing member 3 and the axial end face of the second securing member 4 as much as possible can reduce an amount of protrusion of each of the first and second securing members 3, 4 from the distal end face of the rotor core (e.g., the second rotor core 2), thereby reducing the axial dead space.

(6) The first securing member 3 and the second securing member 4 are made of a magnetic material. With this configuration, the first securing member 3 and the second securing member 4 can form a flux path, which improves the performance.

(7) The seat portion 4a of the second securing member 4 may include either or both of the tapered portion 31a, 45a inclined at a predetermined angle relative to the end face of the rotor 15 and the recessed portion 32b, 46b recessed out of contact with the end face of the rotor 15 (see FIGS. 11-14). With this configuration, the tapered portion 31a, 45a and the recessed portion 32b, 46b can provide springback effects, which allows second securing member 4 to steadily press upon the second rotor core 2. In addition, the mechanically weak magnets 6, 7 are unlikely to be crushed.

(8) The seat portion 4a presses upon the rotor 15, where a region in which the seat portion 4a overlaps a corresponding one of the magnets of the rotor 15 may be of the first radial overlap width (g, i) equal to or less than one-half of the radial width (f, h) of the magnet (i.e., the fifth condition:

g≤f/2, the sixth condition: i≤h/2) (see FIG. 5). This can suppress the region (in width, area or the like) in which the seat portion 4a overlaps the magnet (6,7) of the rotor 15, thereby preventing magnetic leakage from the magnet through the seat portion 4a and thus preventing performance degradation.

(9) The second securing member 44 presses upon the rotor 15, where a region in which the second securing member 44 overlaps each magnet of the rotor 15 may be of the second radial overlap width (k, n) equal to or less than one-half of the radial width (f, h) of the magnet (i.e., the seventh condition: k≤f/2, the ninth condition: n≤h/2) (see FIG. 9). This can suppress the region (in width, area or the like) in which the seat portion 4a overlaps the magnet (6,7) of the rotor 15, thereby preventing magnetic leakage from the magnet through the seat portion 4a and thus preventing performance degradation.

(10) The first securing member 3 may be secured to the shaft 18 or the disc 16(5,51,52,53) via at least one of the crimp 3b, the junction 3c, the fasteners 3d, 3e (see FIGS. 2, 6, 15-17, 20, 21). This allows the rotor 15 to be rigidly secured to the shaft 18 or the disc 16.

(11) The first securing member 3 and the second securing member 4 may be integrated with each other like the securing members 30, 31, 32 (see FIGS. 10, 12, 14). This can reduce the number of components and provide advantages caused by the first securing member 3 and the second securing member 4.

(12) The rotating electric machine MG may includes one of the rotor securing structures as shown in FIGS. 2-17, 20, 21. This can minimize the axial length of the rotating electric machine MG. This can prevent magnetic leakage from the magnets of the rotor through the disc 16(5,51,52,53), thereby preventing performance degradation.

What is claimed is:

1. A rotor securing arrangement for directly or indirectly securing a rotor to a shaft, the rotor having at least one through hole along an axial direction of the rotor, a second hole diameter of the at least one through hole at either or both of axial ends of the rotor being greater than a first hole diameter of the at least one through hole at a portion other than the axial ends of the rotor, the arrangement comprising:
a first securing member corresponding to the first hole diameter of the at least one through hole, the first securing member being passed through the through hole of the rotor; and
a second securing member corresponding to the second hole diameter of the at least one through hole,
wherein the first securing member comprises a flange having a diameter greater than the first hole diameter and less than the second hole diameter for pressing upon the second securing member,
the second securing member has a through hole that the first securing member is passed through, and comprises a seat portion of a diameter greater than the second hole diameter for pressing upon either or both of axial ends of the rotor and a stepped portion within the second hole diameter of the through hole of the rotor for pressing upon the portion other than the axial ends of the rotor, and
the first securing member is configured to secure the rotor to the shaft such that the first securing member is passed through the second securing member and the flange of the first securing member directly contacts the entirety of the inner surface of the stepped portion of the second securing member to press the second securing member against the rotor.

2. The rotor securing arrangement of claim 1, wherein the rotor comprises a first rotor core corresponding to the first hole diameter and a second rotor core corresponding to the second hole diameter.

3. The rotor securing arrangement of claim 1, wherein an axial end face of the first securing member and an axial end face of the second securing member are coplanar or axially stepped from each other by a distance equal to or less than a predefined acceptable range that allows for reducing a axial dead space.

4. The rotor securing arrangement of claim 1, wherein the first securing member and the second securing member are integrated with each other.

5. A rotor securing arrangement for directly or indirectly securing a rotor to a shaft, the rotor having at least one through hole along an axial direction of the rotor, a second hole diameter of the at least one through hole at either or both of axial ends of the rotor being greater than a first hole diameter of the at least one through hole at a portion other than the axial ends of the rotor, the arrangement comprising:
a first securing member corresponding to the first hole diameter of the at least one through hole, the first securing member being passed through the through hole of the rotor; and
a second securing member corresponding to the second hole diameter of the at least one through hole, part of the second securing member being within the second hole diameter of the through hole of the rotor,
wherein the first securing member comprises a flange having a diameter greater than the first hole diameter for pressing upon the second securing member,
the second securing member has a through hole that the first securing member is passed through, a diameter of the through hole of the second securing member being less than a diameter of the flange of the first securing member, and
the first securing member is configured to directly or indirectly secure the rotor to the shaft such that the flange of the first securing member directly presses upon at least a portion of the second securing member against the rotor,
the second securing member comprises a seat portion of a diameter greater than the second hole diameter for pressing upon the rotor,
a thickness of the flange is set greater than a thickness of the seat portion.

6. The rotor securing arrangement of claim 5, wherein the seat portion of the second securing member comprises at least one of a tapered portion inclined at a predetermined angle relative to the axial end face of the rotor and a recessed portion recessed out of contact with the axial end face of the rotor.

7. The rotor securing arrangement of claim 5, wherein a region in which the seat portion pressing upon the rotor overlaps a magnet embedded in the rotor is of a first radial overlap width equal to or less than one-half of a radial width of the magnet.

8. A rotor securing arrangement of for directly or indirectly securing a rotor to a shaft, the rotor having at least one through hole along an axial direction of the rotor, a second hole diameter of the at least one through hole at either or both of axial ends of the rotor being greater than a first hole diameter of the at least one through hole at a portion other than the axial ends of the rotor, the arrangement comprising:

a first securing member corresponding to the first hole diameter of the at least one through hole, the first securing member being passed through the through hole of the rotor; and a second securing member corresponding to the second hole diameter of the at least one through hole, part of the second securing member being within the second hole diameter of the through hole of the rotor, wherein the first securing member comprises a flange having a diameter greater than the first hole diameter for pressing upon the second securing member, the second securing member has a through hole that the first securing member is passed through, a diameter of the through hole of the second securing member being less than a diameter of the flange of the first securing member, and the first securing member is configured to directly or indirectly secure the rotor to the shaft such that the flange of the first securing member directly presses upon at least a portion of the second securing member against the rotor, and the second securing member is an elongated plate-like member extending over two or more poles of the rotor.

9. The rotor securing arrangement of claim 8, wherein a region in which the second securing member pressing upon the rotor overlaps a magnet embedded in the rotor is of a second radial overlap width equal to or less than one-half of the radial width of the magnet.

10. A rotor securing arrangement for directly or indirectly securing a rotor to a shaft, the rotor having at least one through hole along an axial direction of the rotor, a second hole diameter of the at least one through hole at either or both of axial ends of the rotor being greater than a first hole diameter of the at least one through hole at a portion other than the axial ends of the rotor, the arrangement comprising:

a first securing member corresponding to the first hole diameter of the at least one through hole, the first securing member being passed through the through hole of the rotor; and a second securing member corresponding to the second hole diameter of the at least one through hole, part of the second securing member being within the second hole diameter of the through hole of the rotor, wherein the first securing member comprises a flange having a diameter greater than the first hole diameter for pressing upon the second securing member, the second securing member has a through hole that the first securing member is passed through, a diameter of the through hole of the second securing member being less than a diameter of the flange of the first securing member, and the first securing member is configured to directly or indirectly secure the rotor to the shaft such that the flange of the first securing member directly presses upon at least a portion of the second securing member against the rotor, and the first securing member and the second securing member are made of the same magnetic material.

11. A rotor securing arrangement for directly or indirectly securing a rotor to a shaft, the rotor having at least one through hole along an axial direction of the rotor, a second hole diameter of the at least one through hole at either or both of axial ends of the rotor being greater than a first hole diameter of the at least one through hole at a portion other than the axial ends of the rotor, the arrangement comprising:

a first securing member corresponding to the first hole diameter of the at least one through hole, the first securing member being passed through the through hole of the rotor; and a second securing member corresponding to the second hole diameter of the at least one through hole, part of the second securing member being within the second hole diameter of the through hole of the rotor, wherein the first securing member comprises a flange having a diameter greater than the first hole diameter for pressing upon the second securing member, the second securing member has a through hole that the first securing member is passed through, a diameter of the through hole of the second securing member being less than a diameter of the flange of the first securing member, and the first securing member is configured to directly or indirectly secure the rotor to the shaft such that the flange of the first securing member directly presses upon at least a portion of the second securing member against the rotor, and the first securing member is secured to the shaft via at least one of a crimp, a junction, and a fastener.

12. A rotating electric machine comprising a rotor securing arrangement for directly or indirectly securing a rotor to a shaft, the rotor having at least one through hole along an axial direction of the rotor, a second hole diameter of the at least one through hole at either or both of axial ends of the rotor being greater than a first hole diameter of the at least one through hole at a portion other than the axial ends of the rotor, the arrangement comprising:

a first securing member corresponding to the first hole diameter of the at least one through hole, the first securing member being passed through the through hole of the rotor; and a second securing member corresponding to the second hole diameter of the at least one through hole;

wherein the first securing member comprises a flange having a diameter greater than the first hole diameter and less than the second hole diameter for pressing upon the second securing member, the second securing member has a through hole that the first securing member is passed through, and comprises a seat portion of a diameter greater than the second hole diameter for pressing upon either or both of axial ends of the rotor and a stepped portion within the second hole diameter of the through hole of the rotor for pressing upon the portion other than the axial ends of the rotor, and the first securing member is configured to secure the rotor to the shaft such that the first securing member is passed through the second securing member and the flange of the first securing member directly contacts the entirety of the inner surface of the stepped upon at least a portion of the second securing member against the rotor.

* * * * *